(12) United States Patent
Patkar et al.

(10) Patent No.: US 8,623,261 B2
(45) Date of Patent: Jan. 7, 2014

(54) TRANSFORMING PROCESS

(75) Inventors: Mahesh Patkar, Houston, TX (US); Michael Musgrave, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 954 days.

(21) Appl. No.: 12/001,921

(22) Filed: Dec. 13, 2007

(65) Prior Publication Data

US 2009/0156760 A1  Jun. 18, 2009

(51) Int. Cl.
  *B29C 51/02* (2006.01)
  *B29C 51/04* (2006.01)
  *B29C 51/10* (2006.01)

(52) U.S. Cl.
  USPC ...... 264/331.17; 264/292; 264/550; 526/348; 526/351

(58) Field of Classification Search
  USPC .............. 264/331.17, 292, 550; 526/348, 351
  See application file for complete search history.

(56) References Cited

U.S. PATENT DOCUMENTS

| | | | |
|---|---|---|---|
| 5,843,346 A | 12/1998 | Morrill | |
| 5,985,079 A * | 11/1999 | Ellison | 156/244.23 |
| 6,090,325 A | 7/2000 | Wheat et al. | |
| 6,262,199 B1 | 7/2001 | Ewen et al. | |
| 6,313,242 B1 | 11/2001 | Reddy | |
| 6,346,575 B1 | 2/2002 | Debras et al. | |
| 6,565,970 B2 | 5/2003 | Gownder et al. | |
| 6,582,631 B1 | 6/2003 | Shepard | |
| 6,765,068 B2 | 7/2004 | Albe et al. | |
| 6,926,513 B2 | 8/2005 | Schlepp | |
| 7,022,797 B2 | 4/2006 | Blackmon et al. | |
| 7,071,462 B2 | 7/2006 | Young | |
| 2001/0044506 A1 | 11/2001 | Mehta | |
| 2003/0232112 A1 | 12/2003 | Whitmore | |
| 2006/0251913 A1 * | 11/2006 | Albe | 428/516 |
| 2006/0255038 A1 * | 11/2006 | Hollis et al. | 220/254.3 |
| 2006/0261068 A1 * | 11/2006 | Schmidtner et al. | 220/254.9 |
| 2007/0040292 A1 * | 2/2007 | Ashbaugh et al. | 264/40.1 |
| 2007/0224376 A1 * | 9/2007 | Ambroise | 428/35.9 |
| 2007/0235896 A1 | 10/2007 | McLeod | |
| 2009/0186999 A1 * | 7/2009 | Sun et al. | 526/348.1 |

FOREIGN PATENT DOCUMENTS

WO  WO 2006/047376  5/2006

OTHER PUBLICATIONS

Total Petrochemicals Polypropylene M3282MZ product sheet, Oct. 2005.*

* cited by examiner

*Primary Examiner* — Roberto Rabago

(57) ABSTRACT

A method of preparing a thermoformed article which is relatively isotropic in terms of shrinkage of the final thermoformed article along the sheet extrusion flow path (the longitudinal direction) and the transverse direction. The article is prepared from an isotactic polypropylene produced by the polymerization of propylene with an isospecific metallocene catalyst. The polymer has a melt flow rate within the range of 1-5 grams/10 minutes and a melting temperature of no more than 160° C. The polypropylene is extruded to provide a sheet which is oriented in at least one direction and has a thickness of 10-100 mils. The sheet is heated to a temperature of 135-160° C, and thermoformed in contact with a template having the desired configuration to produce the thermoformed article. The thermoformed article is then cooled and retrieved from the template to arrive at the final product.

23 Claims, 5 Drawing Sheets

TRANSFORMING PROCESS

FIELD OF THE INVENTION

This invention relates to the preparation of thermoformed articles formed of an isotactic polypropylene and more particularly to the preparation of such thermoformed articles exhibiting good dimensional stability.

BACKGROUND OF THE INVENTION

Isotactic polypropylene can be produced by the polymerization of propylene in the presence of catalysts such as Ziegler Natta catalysts or isospecific metallocene catalysts. Isotactic polypropylene can be used in the production of molded articles in which the polypropylene is heated and then extruded through one or more dies or nozzles into a mold cavity in which it moves in both a longitudinal direction (referred to as the flow direction) and in a transverse or lateral direction (sometimes referred to as the cross flow direction). The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

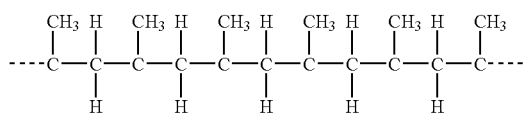

Stereoregular polymers, such as isotactic and syndiotactic polypropylene, can be characterized in terms of the Fisher projection formula. Using the Fisher projection formula, the stereochemical sequence of isotactic polypropylene as shown by Formula (1) is described as follows:

Another way of describing the structure is through the use of NMR. Bovey's NMR nomenclature for an isotactic pentad is . . . mmmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer. In the case of random ethylene propylene copolymers, a relatively low ethylene content in the copolymer is randomly distributed throughout the polymer chain so that ethylene units are randomly interposed between the repeating propylene units.

Polypropylene can be formed into molded articles through various operations in which the polymer is heated and conformed to a desired shape and then cooled at to arrive at the final product. Two well known operations involve injection molding and thermoforming.

In injection molding operations, the molten polymer is introduced into a mold cavity. The molten polymer is retained in the cavity for a sufficient time to allow the desired component to form. The period of time required for cooling and subsequent removal of the molded component from the mold cavity is an important factor in the manufacturing efficiency of the injection molding operation.

In thermoforming operations the molten polymer is subjected to a sheet extrusion operation followed by thermoforming of the sheet over a template to arrive at the desired shape of the thermoformed article followed by cooling of the article which is then recovered from the template. Typical thermoforming operations may be carried out employing sheet extrusion and formation of a sheet roll which is then used in a roll fed continuous thermoforming unit. Thermoforming may also be carried out with integrated in-line systems in which a heat extrusion system and thermoforming system are integrated into one automated unit. After the thermoforming operation, the thermoformed article is cooled and then trimmed as necessary to arrive at the final product followed by recovery of the product from the automatic system.

During the manufacturing of formed plastic components by injection molding, shrinkage within the mold and subsequent withdrawal of the hard component from the mold results in a volume difference between the initial and the final molded article. If the dimensional changes are relatively uniform in the transverse (cross flow) and longitudinal (flow) directions of the mold, the shrinkage characteristic is considered to be isotropic. With significant differential dimensional changes in the transverse and longitudinal directions, the dimensional changes are characterized as anisotropic or differential. Warpage is caused by variations in shrinkage throughout injection molded part (D Rosata, Injection Molding Handbook, Chapman & Hall, New York, 1995). More anisotropic shrinkage often leads to warpage problems in injection molding applications. Regardless of whether the shrinkage characterized is isotropic or anisotropic, the relative shrinkage should be taken into account in order to obtain the end use articles of the molded article of the correct dimension. Similar considerations can apply in the case of sheet extrusion and thermoforming operations. In this case, the direction of the continuous linear extrusion leading from the sheet extrusion system to the thermoforming system can be considered to be a longitudinal flow direction and the transverse direction across the direction of the flow of the sheet extrusion system can be considered to be the transverse direction.

SUMMARY OF THE INVENTION

In accordance with the present invention, there is provided a method for the preparation of a thermoformed article which is considered to be relatively isotropic in nature in terms of shrinkage of the final thermoformed article along the sheet extrusion flow path (the longitudinal direction) and the transverse direction. In carrying out the invention, there is provided an isotactic polypropylene produced by the polymerization of propylene in the presence an isospecific metallocene catalyst. The polypropylene may be a homopolymer or a copolymer, specifically an ethylene propylene copolymer contains small amounts of ethylene, typically up to 2½ wt. %. The polymer has a melt flow rate within the range of 1-5 grams/10 minutes and a melting temperature of no more than 160° C. The polypropylene is extruded to provide a sheet which is oriented in at least one direction (the longitudinal direction) and has a thickness within the range of 10-100 mils and more specifically 15-80 mils. The sheet is heated to a temperature within the range of 135-160° C. and more specifically 140-150° C., and thermoformed in contact with a template having the desired configuration to produce the thermoformed article. The thermoformed article is then cooled and retrieved from the template to arrive at the final product.

In one embodiment of the invention, the final thermoformed article has a uniformed shrinkage at 48 hours after thermoforming of at least 85%, as determined by the differential in transverse and longitudinal shrinkages of the thermoformed product at 48 hours after retrieving the thermoformed article from the template. In further aspect of the invention, the thermoformed article is characterized as having a shrinkage 48 hours after retrieving the article from the template which is more isotropic than the shrinkage of a corresponding article formed with isotactic polypropylene produced by the polymerization of a Ziegler Natta catalyzed polymer which is then extruded and thermoformed under the same conditions as the metallocene catalyzed polymer.

In a further aspect of the invention, the isotactic polypropylene has a melt flow rate within the range of 1.5-5 grams/10 minutes, and more specifically, within the range of 2-4 grams/10 minutes. In yet another embodiment of the invention, the isotactic polypropylene has a melting temperature within the range of 150-155° C.

Another embodiment of the invention is carried out with isotactic polypropylene having an isotacity of least 98% and more particularly 99% as determined by the percent of the polymer fluff which is not xylene soluble. Prior to extruding isotactic polypropylene, an additive component selected from a group consisting of a nucleating agent, a clarifying agent, and mixtures thereof maybe incorporated into the polymer.

BRIEF DESCRIPTION OF THE DRAWINGS

FIG. 4 is a schematic illustration of a plug-assisted vacuum forming operation in successive stages.

DETAILED DESCRIPTION OF THE INVENTION

Figure 1:
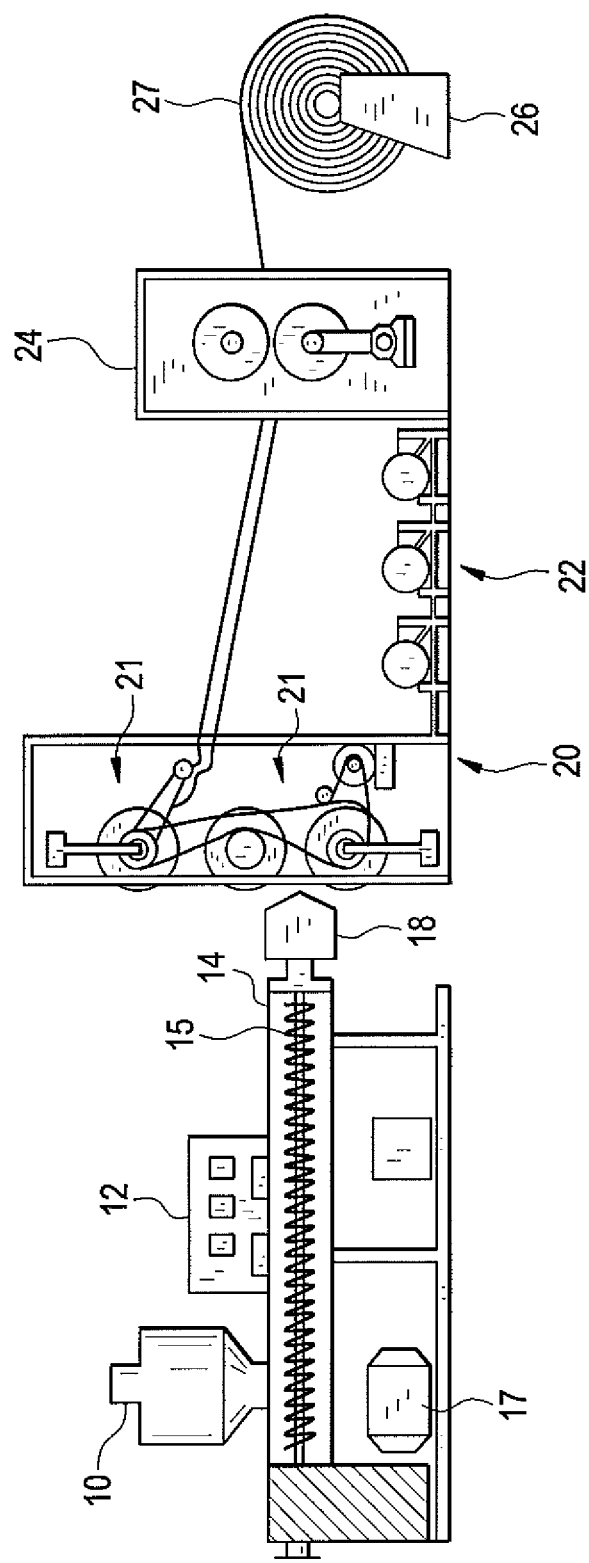
FIG. 1 is a schematic illustration of a sheet extrusion system which may be employed in carrying out the invention.
Figure 2:
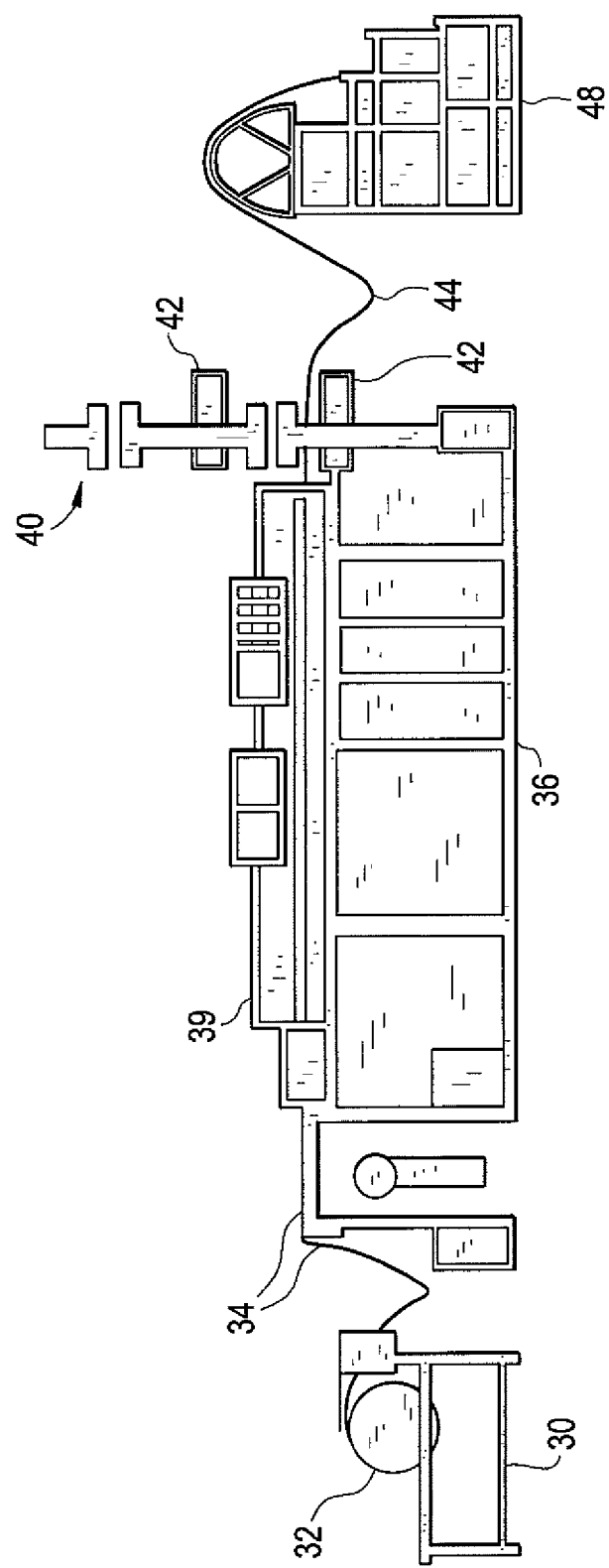
FIG. 2 is a schematic illustration of a roll fed continuous thermoforming system which may be employed in carrying out the invention.

The present invention can be carried out with any suitable sheet extrusion and thermoforming systems. The systems may take the form of extrusion winding systems in which the polymer pellets are converted to sheets which are then applied to a winder to produce a sheet roll. The sheet on the roll is unwound and supplied to a thermoformer to convert the sheet to thermoformed parts. FIGS. 1 and 2 schematically illustrate systems in which the polymer pellets are converted to extrusion sheets followed by conversion of the extrusion sheets to parts through a roll fed continuous thermoformer. More particularly and as shown in FIG. 1, the sheet forming system comprises a hopper 10 through which polymer pellets are supplied to a screw extrusion unit 12 which comprises a heated outer cylinder 14 within which an extrusion screw 15 rotates and takes in a pelletized polymer material from the hopper 10. The extrusion unit 12 comprises a drive unit 17 for the rotatable screw and a die section 18 through which a molten polymer is extruded to form a continuous sheet. The sheet is supplied from the die to a take-away unit 20 which comprises a chill roll stack comprising a plurality of chill rolls 21. The chill roll stack is cooled by a coolant supplied by a coolant pumping unit 22. The sheet is withdrawn from the chill roll stack through a pull roll section 24 and supplied from there onto a winder section 26 in which a sheet roll 27 is formed. FIG. 2 illustrates a roll fed continuous thermoformer system which comprises an unwind stand 30 from which a sheet roll 32 is unwound and the sheet 34 supplied to the thermoformer 36 comprising an oven section 39 within which the sheet is heated and then supplied to a forming section 40 in which the isothermoforming operation takes place. Forming section 40 comprises one or more template and conforming members 42 which cooperate to form a web 44 of shaped objects from the sheet 34. The resulting web of thermoformed articles are supplied to a trim press 48.

Figure 3:
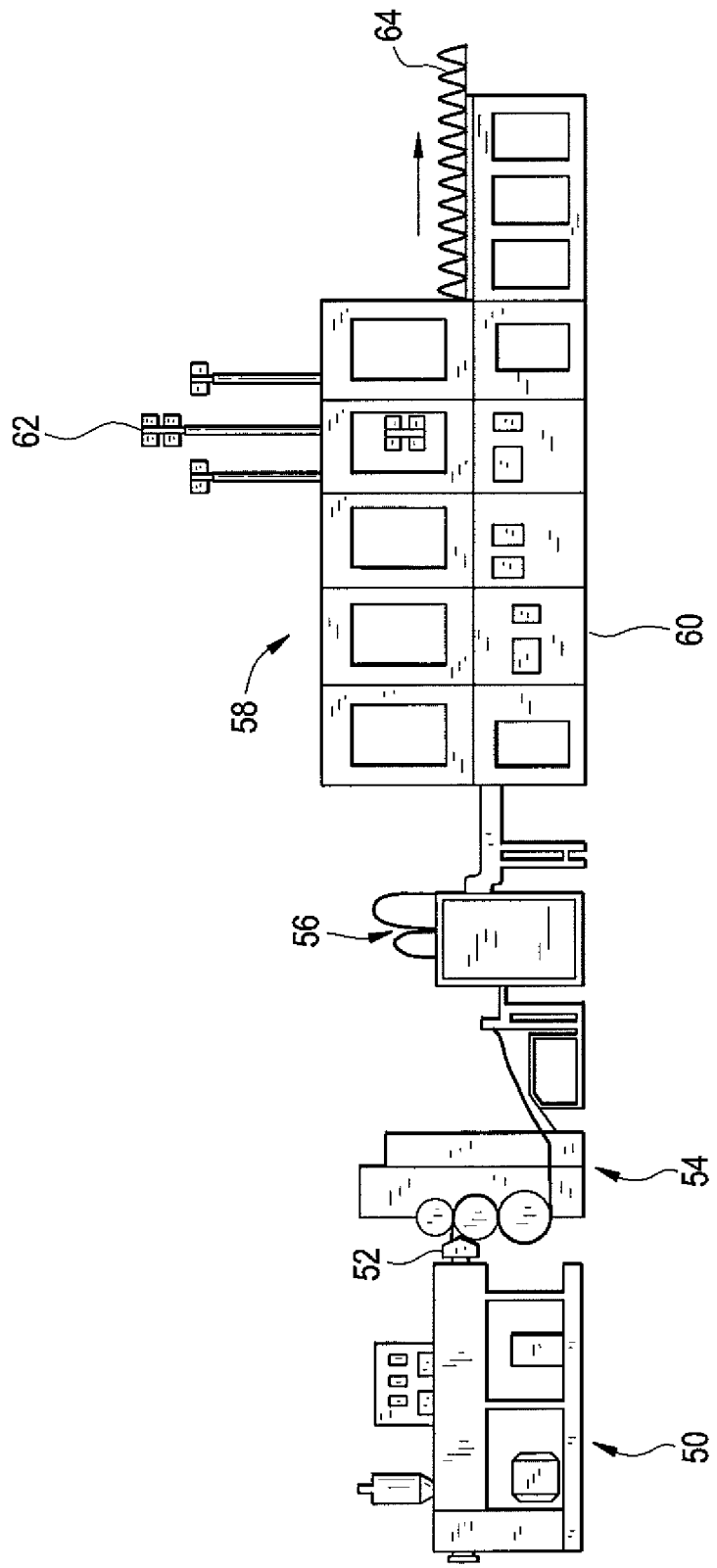
FIG. 3 is a schematic illustration of an in-line continuous thermoforming system which may be employed in carrying out the invention.

FIG. 3 illustrates another system which can be employed in carrying out the present invention. In FIG. 3, there is illustrated an integrated in-line continuous thermoforming unit in which polymer pellets are converted directly to the final parts rather than through the use of an intermediate sheet-roll system. As shown in FIG. 3, a screw extrusion system 50 (corresponding to unit 12 of FIG. 1) is operated to produce a sheet which is withdrawn through a die 52 and applied to a chill roll stack 54. The sheet is supplied from the chill roll stand 54 to an accumulator 56 which functions to interface the roll stand 54 with a thermoforming unit 58. The forming unit comprises an oven section 60 as described previously and a forming section 62 in which the thermoformed parts are formed. The thermoformed parts are withdrawn in a web system 64 which is then supplied to a trim press as described previously.

Figure 4A:
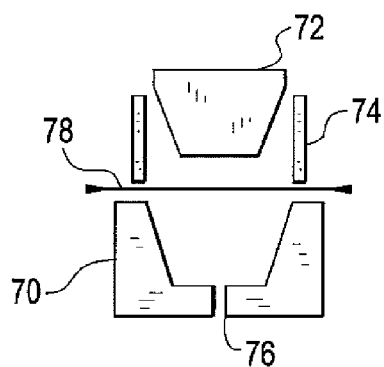
FIG. 4A illustrates the initial stage of operation.
Figure 4B:
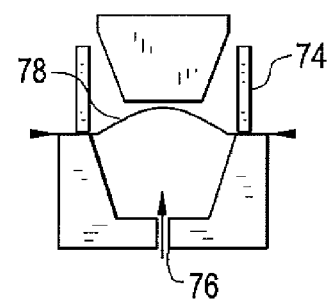
FIG. 4B illustrates the pre-stretching extension of a sheet.
Figure 4C:
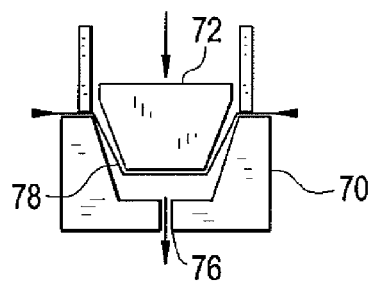
FIG. 4C illustrates the plug member pressing the sheet member downward within the template member.
Figure 4D:
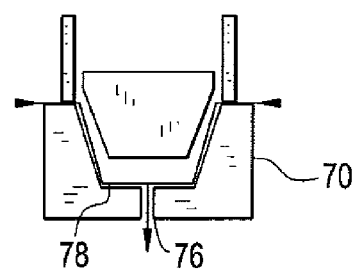
FIG. 4D illustrates the imposition of the vacuum to the interior of the template member.

The forming section, as illustrated in FIG. 2 or FIG. 3, may be of any suitable type typically involving a female template member and a conforming plug member which extends into the template member. The operation of a typical forming station which involves a plug assisted vacuum forming operation is illustrated schematically in FIG. 4 in which successive stages of operation are labeled as A, B, C, and D. As shown in FIG. 4, the forming section comprises a template member 70, a plug member 72 which conforms in shape with the internal portion of the template member, and a clamping frame 74. Template 70 is provided with a gas port 76. In the initial stage of operation, as shown in FIG. 4A, a sheet of polymer material 78 is transported into the forming section while the clamp frame and plug member are withdrawn from the template member. After the polymer sheet 78 is in place, the clamp frame 74 is moved into contact with the template to hold the sheet in place and a pressurizing gas introduced into the bottom of the template through opening 76. This results in a pre-stretching extension of the sheet member 78 as shown in FIG. 4B. In the next stage of operation, shown in FIG. 4C, the interior of the template member is vented or placed under a vacuum and the plug member 72 enters into the template to press the sheet member downwardly within the conforming interior of the template member. As shown in FIG. 4D, a vacuum is then imposed in the interior of the template member through port 76 in order to bring the sheet into conformance with the interior of the template member 70 to arrive at the thermoformed article of the desired shape. In conclusion of the forming operation, the clamp frame is withdrawn from the template member and the web containing the thermoformed article is then removed from the forming section. It is to be recognized that the thermoforming systems illustrated in FIGS. 1-4 are exemplary only and any suitable thermoforming system may be used when carrying out the present invention. For a further description of thermoforming techniques and systems which may be employed in themoforming operations to carry out the present invention, reference is made to U.S. Pat. No. 6,926,513 to Schlepp and U.S. Pat. No. 7,071,462 to Young.

As will be understood to those skilled in the art, the plug assisted forming methods, such as those described above with reference to FIG. 4, can be used to produce containers such as containers for food and the like, and closure members for such containers. In such containers, dimensional consistency between the containers and the lids, or closures members therefore, can be very important. The present invention can be used to employ such containers and closure members therefore of very good dimensional consistency.

The present invention has a particular application in a formation of lids for food containers and the like where dimensional consistency is very important. An example can be found in leak proof thermoformed lids which are configured to have a closure member which is adapted to fit over an access opening of a container and a lip section which extends from the closure member. The lip section is adapatably placed in contact with a wall segment of the container, such as in a "snap-on" operation.

Figure 5:
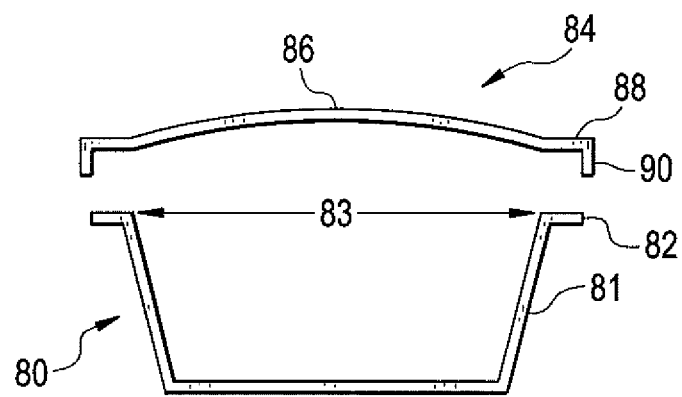
FIG. 5 is side elevation with parts broken away of a container/lid structure which is thermoformed in accordance with the present invention.
Figure 6:
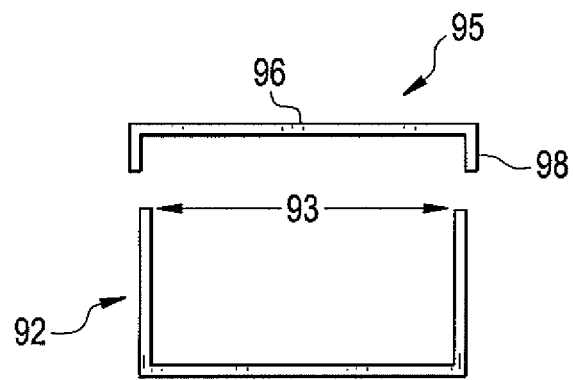
FIG. 6 is a side elevation with parts broken away of another container/lid structure which may be formed in accordance with the present invention.

Referring now to FIG. 5, there is illustrated a container, such as may be formed in the thermoforming operation of FIG. 4 and an associated container lid also formed by thermoforming. The container 80 comprises a wall 81 terminating at a transverse rim 82 which surrounds an opening 83 in the container which provides access to its interior. The closure lid 84 (shown in exploded view immediately above the container) comprises a closure member 86 which fits over the access opening. The lid further comprises a lip section 88 extending from the closure member 86 which extends outwardly and terminates in a downwardly extending snap-on rim 90. As shown in FIG. 5, the lip section 88 fits on top of the rim 82 of the container and the rim 90 snaps over the outer edge of the rim in a so-called snap-on configuration. Another example of a container and lid configuration in which dimensional consistency is important is illustrated in FIG. 6 which is a side-view with parts broken away of a container 92 having an access opening 93 over which a lid 95 having a closure member 96 fits. The lid structure in this case terminates in a downwardly extending lip section 98 which fits over the upper outer wall of the container.

The isotactic propylene polymer employed in carrying out the present invention can be a homopolymer of propylene or a copolymer of propylene. Where a copolymer is employed, it may take the form of an ethylene propylene random copolymer, typically containing up to 2 ½ wt. % ethylene, and more specifically, up to 2 wt. % ethylene. Lower amounts of ethylene, up to 1 wt. % ethylene, can be incorporated into the random copolymer. The melting temperature is somewhat dependent upon the ethylene content and may range from about 135° C. for copolymers in which the ethylene content is about 2 wt. % or slightly above, up to about 155° C. or even 160° C. in the case of homopolymers. A more specific melting temperature is about 150-155° C. in the case of homopolymers, or copolymers of very little ethylene content.

The isotactic propylene polymer employed in carrying out the present invention can be produced by the polymerization of propylene, together with ethylene in the case of a copolymer, over any suitable isospecific metallocene, such as a metallocene formed of a bridged bis indenyl (or tetrahydrobisindenyl) ligand structure. The bis indenyl ligand structure may be substituted or unsubstituted. A specific metallocene which may employed to produce the isotactic polypropylene is a di-methylsilyl bis(2-methyl, 4-pheny), zirconium dichloride and a co-catalyst comprising an alky alumoxane such as methylalumoxane and a scavenger such as triethylaluminum (TEAL). The isotactic polypropylene is further characterized by isotacity of at least 98% and more specifically at least 99%. The isotacitity is determined by measuring the amount of polymer fluff as recovered from the polymerization reactor which is not soluble in xylene at or slightly above room temperature. In terms of the stereoregularity of the polymer, the polymer can be expected to have at least 99% meso diads.

The isotactic polypropylene employed in the present invention is further characterized by a melting temperature of 155° C. or less and a melt flow rate within the range of 1-5 grams/10 minutes. The melt flow rate, is determined in accordance with ASTM D1238 condition L which specifies a temperature of 230° C. and a load of 2.16 kg with the result reported in terms of grams/10 minutes. They may be identified as melt index $MI_2$. A more specific characterization of the melt flow rate of the polymer employed in carrying out the present invention is a melt flow rate within the range of 1.5-5 grams/10 minutes, and more specifically, 2-4 grams/10 minutes. The polymer, as noted previously, exhibits a melting temperature of no more than 160° C. and usually no more than 155° C. This is well below the melting temperatures of a corresponding isotactic polypropylene produced by a Ziegler Natta catalyst which would exhibit a melting temperature greater than 160° C. More specifically, the melting temperature of the metallocene based isotactic polypropylene employed in the present invention is within the range of 150-155° C.

The thermoformed articles produced in accordance with the present invention can be characterized in terms of uniform shrinkage of the article at a designated time after thermoforming as determined by the differential in transverse and longitudinal shrinkages at the designated time after retrieving the thermoformed article from the forming section. The shrinkage values are determined in terms of longitudinal and transverse or cross-flow directions with reference to the extrusion direction of the original polymer sheet as applied to the thermoforming system. The longitudinal direction is considered the direction of flow of the extruded sheet as it is withdrawn from the die in the extrusion section. That is, the longitudinal direction, is the direction in which the sheet is moved in the thermoformer system as it is unrolled from a sheet roll in a roll-fed system of the type depicted in FIG. 2 or as it withdrawn from the accumulator and moved through the oven in the in-line continuous thermoforming system of the type depicted in FIG. 3. The transverse direction is the cross-flow direction as the sheet is extruded through the die and, in terms of movement in the thermoforming system, the transverse direction is 90° from the flow direction of the polymer sheet as it moves through the thermoforming system.

The uniformity of shrinkage at a designated time after thermoforming indicates the resistance to a tendency of warping of the thermoformed article. Where the shrinkage is identical in both the longitudinal and transverse directions, the uniform shrinkage factor of the article is 100% indicating no warping. Where the shrinkage in one of the longitudinal and transverse directions varies by 10% from the shrinkage in the other direction the article is characterized as having a uniform shrinkage factor of 90% indicating only moderate warping. Where a differential in shrinkage in one direction as compared with the other direction is 20%, the article will be characterized as having a uniform shrinkage factor of 80%. In the present invention a target for uniform shrinkage at 48 hours after thermoforming is at least 85% as determined by the differential in transverse and longitudinal shrinkages. In a further aspect of the invention, the uniform shrinkage factor at 48 hours after thermoforming is at least 90% as determined by the differential in transverse and longitudinal shrinkages at 48 hours after the retrieval of the thermoformed article from the thermoforming station.

The metallocene catalyzed isotactic polypropylene employed in the present invention can also be characterized in terms of its isotropic characteristics relative to the corresponding isotactic polymer of the same isotacity and molecular weight produced by polymerization of propylene with a Ziegler Natta catalyst. Specifically, the metallocene catalyzed polypropylene employed in the present invention has a shrinkage at 48 hours after retrieving the thermoformed article which is more isotropic than the isotactic polypropylene produced by the polymerization of propylene with a Ziegler Natta catalyst and then extruded and thermoformed under identical conditions to that employed in producing the thermoformed article from the metallocene in accordance with the present invention.

As noted previously, metallocene catalysts which may be employed in polymerization of the propylene homopolymer or ethylene-propylene copolymers employed in the present invention include bridged bis indenyl or bis tetrahydroindenyl metallocenes which are known to function to exhibit high isospecificity. These metallocenes, which may be substituted or unsubstituted, are racemic or at least have a substantially high content of racemic isomers as compared with meso isomers. The bis indenyl (or tetrahydroindenyl) ligands may be substituted or unsubstituted, especially suitable racemic bis indenyl structures are those in which the indenyl groups are substituted by a bulky substituent, e.g., phenyl or tertiary butyl, at the 4 position and with less bulky substituents, e.g., methyl or ethyl groups, at the 2 position. Other metallocenes which can be employed in producing isotatic polypropylene include stereo rigid cyclopentadienyl-fluorenyl ligand structures which are substituted on either or both of the cyclopentadienyl and fluorenyl groups in a manner to eliminate the bilateral symmetry which would normally be present in the cyclopentadienyl-fluorenyl ligand structure. Other metallocene catalysts which may be employed in producing ethylene propylene copolymers used in the process of the present invention include metallocenes incorporating bis fluorenyl ligand structures of a staggered conformation. Here the fluorenyl groups (including octohydro fluorenyl groups) are bridged and the two fluornyl groups are independently substituted on opposed sides of the bridged symmetry line through the ligand structure in order to provide a staggered conformation in which bilateral symmetry is eliminated. The transition metals employed in forming metallocene catalysts of the type described above are normally from Group 4 or Group 5 of the Periodic Table of Elements (new notation). Especially suitable transition metals are zirconium hafnium and titanium. For a further description of bridged metallocene catalysts which are effective in producing isotatic polymers, reference is made to U.S. Pat. No. 6,262,199 to Ewen, et al and U.S. Pat. No. 6,313,242 to Reddy, the entire disclosures of which are incorporated herein by reference.

Having described specific embodiments of the present invention, it will be understood that modifications thereof may be suggested to those skilled in the art, and it is intended to cover all such modifications as fall within the scope of the appended claims.

The invention claimed is:

1. A method for preparing a thermoformed article comprising:
   (a) providing an isotactic propylene polymer produced by the polymerization of propylene in the presence of an isospecific metallocene catalyst, said polymer having a melt flow rate ($MI_2$) within the range of 1-5 grams/10 minutes and a melting temperature of no more than 160° C.;
   (b) extruding said polypropylene to provide a sheet which is oriented in at least one direction and has a thickness within the range of 10-100 mils after orientation;
   (c) heating said sheet at a temperature within the range of 135-160° C. and thermoforming said sheet over a template having a desired configuration to produce said thermoformed article, wherein said sheet is subjected to a pre-stretching extension prior to production of said thermoformed article;
   (d) cooling said thermoformed article and retrieving said thermoformed article from said template; and
      wherein said thermoformed article has a uniform shrinkage of at least 85% as determined by a differential in transverse and longitudinal shrinkages 48 hours after said thermoformed article has been cooled and retrieved;
      wherein the thermoformed article comprises a single polymer comprising the isotactic propylene polymer.

2. The method of claim 1 wherein said thermoformed article comprises a container and an associated container lid, wherein the lid is adapted to fit over an access opening of said container; and
   wherein the thermoformed article has a shrinkage at 48 hours after retrieving said thermoformed article which is more isotropic than a shrinkage of a corresponding article formed with isotactic polypropylene polymerized by a Ziegler Natta catalyst and extruded and thermoformed under the same conditions of said thermoformed article of subparagraphs (a) through (d).

3. The method of claim 1 wherein said sheet has a thickness within the range of 15-80 mils.

4. The method of claim 1 wherein said isotactic polypropylene has a melt flow rate within the range of 1.5-5.0 grams/10 minutes.

5. The method of claim 4 wherein said isotactic polypropylene has a melt flow rate within the range of 2-4 grams/10 minutes.

6. The method of claim 5 wherein said isotactic polypropylene has a melting temperature within the range of 150-155° C.

7. The method of claim 2 wherein said sheet is heated at a temperature within the range of 140-150° C. to produce said thermoformed article.

8. The method of claim 1 wherein said isotactic propylene polymer has an isotacticity of at least 98%.

9. The method of claim 2 wherein said isotactic propylene polymer has an isotacticity of at least 99%.

10. The method of claim 8 further comprising prior to extruding said propylene polymer in subparagraph (b), incorporating into said isotactic propylene polymer an additive component, selected from a group consisting of a nucleating agent, a clarifying agent, and mixtures thereof.

11. The method of claim 1 wherein said thermoformed article has a uniform shrinkage at 48 hours after thermoforming of at least 90% as determined by a differential in transverse and longitudinal shrinkage at 48 hours after retrieving said thermoformed article.

12. The method of claim 8 wherein said thermoformed article comprises a lid structure adapted to be applied to an associated container, and wherein the lid comprises a closure member adapted to fit over an access opening of said container, and wherein a lip section of the lid extends from said closure member and is adapted to be in contact with a wall of said container.

13. The method of claim 2 wherein said isotactic propylene polymer has a melting temperature within the range of 150-155° C., and wherein the thermoformed article comprises a container and an associated container lid.

14. The method of claim 13 wherein said thermoform lid is configured to have a lip section and a closure member, wherein the lip extends from the closure member;
   wherein the lid is adapted to fit over an opening of the associated container; and
   wherein the lip section of the lid is adaptably placed in contact with a wall segment of the container to thereby have a leak-proof fit.

15. The method of claim 12 wherein said container is configured to have a rim, and wherein the lip section of the lid fits and snaps-on over an outer edge of the container rim.

16. The method of claim 12 wherein said closure member of said lid structure has a uniform shrinkage at 48 hours after thermoforming of at least 90% as determined by the differential in transverse and longitudinal shrinkage of said closure member at 48 hours after retrieving said thermoformed article.

17. The method of claim 12 wherein said closure member has a shrinkage at 48 hours after retrieving said closure member which is more isotropic than the shrinkage of a corresponding closure member formed with a corresponding isotactic propylene polymer produced by polymerization of propylene with a Ziegler Natta catalyst and extruded and thermoformed under the same conditions of said closure member of subparagraphs (a) through (d).

18. The method of claim 1 wherein said isotactic propylene polymer is a propylene homopolymer.

19. The method of claim 1 wherein said isotactic propylene polymer is an ethylene propylene copolymer.

20. The method of claim 19 wherein said ethylene propylene copolymer is a random copolymer having an ethylene content of up to 2 wt.%.

21. A method for the preparation of a thermoformed article formed of an isotactic propylene polymer comprising:

a. providing an isotactic propylene polymer produced by the polymerization of propylene in the presence of an isospecific metallocene catalyst, said polymer having a melt flow rate ($MI_2$) within the range of 1-5 grams/10 minutes and a melting temperature of no more than 160° C.;

b. extruding said polypropylene to provide a sheet which is oriented in at least one direction and has a thickness within the range of 10-100 mils;

c. heating said sheet at a temperature within the range of 135-160° C. and thermoforming said sheet over a template having a desired configuration to produce said thermoformed article, wherein said sheet is subjected to a pre-stretching extension prior to production of said thermoformed article;

d. cooling said thermoformed article and retrieving said thermoformed article from said template;

wherein the thermoformed article is comprised of a container and an associated container lid;

wherein said thermoformed article has a uniform shrinkage at 48 hours after thermoforming of at least 85% as determined by a differential in transverse and longitudinal shrinkages at 48 hours after retrieving said thermoformed article; and wherein an entirety of the sheet is oriented in at least one direction, and wherein the thermoformed article comprises a single polymer comprising the isotactic propylene polymer.

22. A thermoformed article having a uniform shrinkage at 48 hours after thermoforming of at least 85% as determined by a differential in transverse and longitudinal shrinkages at 48 hours after retrieving said thermoformed article said thermoformed article comprises a single polymer comprising a metallocene catalyzed isotactic propylene polymer having a melt flow rate ($MI_2$) within the range of 1-5 grams/10 minutes and a melting temperature of no more than 160° C., wherein the metallocene catalyzed isotactic propylene polymer is extruded into a sheet that is subjected to a pre-stretching extension prior to production of the thermoformed article from the sheet.

23. The thermoformed article of claim 22, wherein an entirety of the sheet is oriented in at least one direction.

* * * * *